(12) United States Patent
Thorsson et al.

(10) Patent No.: US 9,439,444 B2
(45) Date of Patent: *Sep. 13, 2016

(54) FAT/MEAT GRADING METHOD AND SYSTEM

(71) Applicant: Marel HF, Gardabaer (IS)

(72) Inventors: Brynjolfur Thorsson, Reykjavik (IS); Vidar Erlingsson, Gardabaer (IS); Saevar Gardarsson, Mosfellsbaer (IS)

(73) Assignee: MAREL HF, Gardabaer (IS)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,176

(22) Filed: May 28, 2015

(65) Prior Publication Data

US 2015/0257397 A1    Sep. 17, 2015

Related U.S. Application Data

(63) Continuation of application No. 14/336,049, filed on Jul. 21, 2014, now Pat. No. 9,066,524, which is a continuation of application No. 13/696,192, filed as application No. PCT/EP2011/002299 on May 9, 2011, now Pat. No. 8,820,534.

(30) Foreign Application Priority Data

May 7, 2010 (DK) .................................. 2010 00406

(51) Int. Cl.
*A22C 17/00* (2006.01)
*B07C 5/00* (2006.01)
*B07C 5/34* (2006.01)

(52) U.S. Cl.
CPC ......... *A22C 17/008* (2013.01); *A22C 17/0073* (2013.01); *A22C 17/0093* (2013.01); *B07C 5/00* (2013.01); *B07C 5/34* (2013.01)

(58) Field of Classification Search
CPC ............ A22C 17/0093; A22C 17/008; A22C 17/0073; B07C 5/00; B07C 5/34
USPC ............ 209/3.1, 3.2, 577, 589; 99/485, 486; 426/231, 388, 646
See application file for complete search history.

(56) References Cited

U.S. PATENT DOCUMENTS 3,396,280 A    8/1968 Stenberg
3,930,991 A    1/1976 Gillespie
(Continued)

FOREIGN PATENT DOCUMENTS

EP    0781172 B1    7/1997
GB    2116732 A    9/1983
(Continued)

OTHER PUBLICATIONS

International Preliminary Report on Patentability; International Application No. PCT/EP2011/002299; May 22, 2012.*
(Continued)

*Primary Examiner* — David H Bollinger
(74) *Attorney, Agent, or Firm* — Pearne & Gordon LLP

(57) ABSTRACT

Method and system for processing of meat trim products, where trim products are supplied as a sequence of collections of trim (COTs), each collection of trim (COT) comprising a plurality of trim products, whereby:
a fat/meat relationship for a collection of trim (COT) is measured;
a collection of trim (COT) is transferred to a selected station by a separator, controlled by a controller; and whereby
a batch is completed at a selected station on the basis of data for said fat/meat relationship, said batch comprising one or more collections of trim (COTs) and fulfilling a predetermined criterion regarding a total fat/meat relationship.

32 Claims, 3 Drawing Sheets

(56) References Cited

U.S. PATENT DOCUMENTS

Figure 1A:
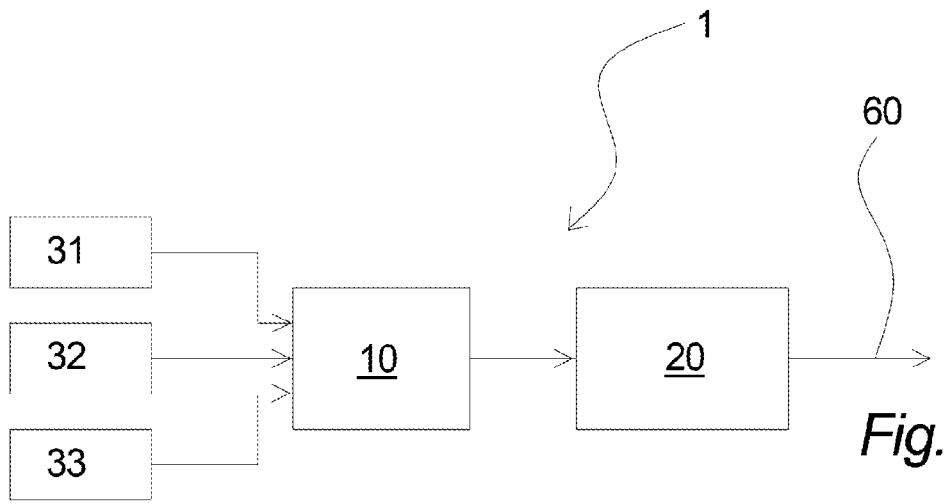

| | | | |
|---|---|---|---|
| 4,171,164 A | 10/1979 | Groves et al. | |
| 5,215,772 A | 6/1993 | Roth | |
| 8,820,534 B2* | 9/2014 | Thorsson | A22C 17/008 209/3.1 |
| 9,066,524 B2* | 6/2015 | Thorsson | |
| 2007/0293980 A1 | 12/2007 | Gudjonsson et al. | |
| 2012/0128838 A1 | 5/2012 | Virippil et al. | |

FOREIGN PATENT DOCUMENTS

| | | |
|---|---|---|
| WO | WO0107324 A1 | 2/2001 |
| WO | WO0127567 A2 | 4/2001 |
| WO | WO0191565 A1 | 12/2001 |
| WO | WO03046533 A2 | 6/2003 |
| WO | WO03069285 A2 | 8/2003 |
| WO | WO03077662 A1 | 9/2003 |
| WO | WO2005090964 A1 | 9/2005 |
| WO | WO2008095500 A2 | 8/2008 |
| WO | WO2009098171 A1 | 8/2009 |
| WO | WO2009102457 A1 | 8/2009 |
| WO | WO2009138088 A1 | 11/2009 |
| WO | WO2011138052 A1 | 11/2011 |

OTHER PUBLICATIONS

International Search Report; International Application No. PCT/EP2011/002299; Date of Actual Completion of Report: Sep. 26, 2011; Date of Mailing of International Search Report: Oct. 6, 2011.

* cited by examiner

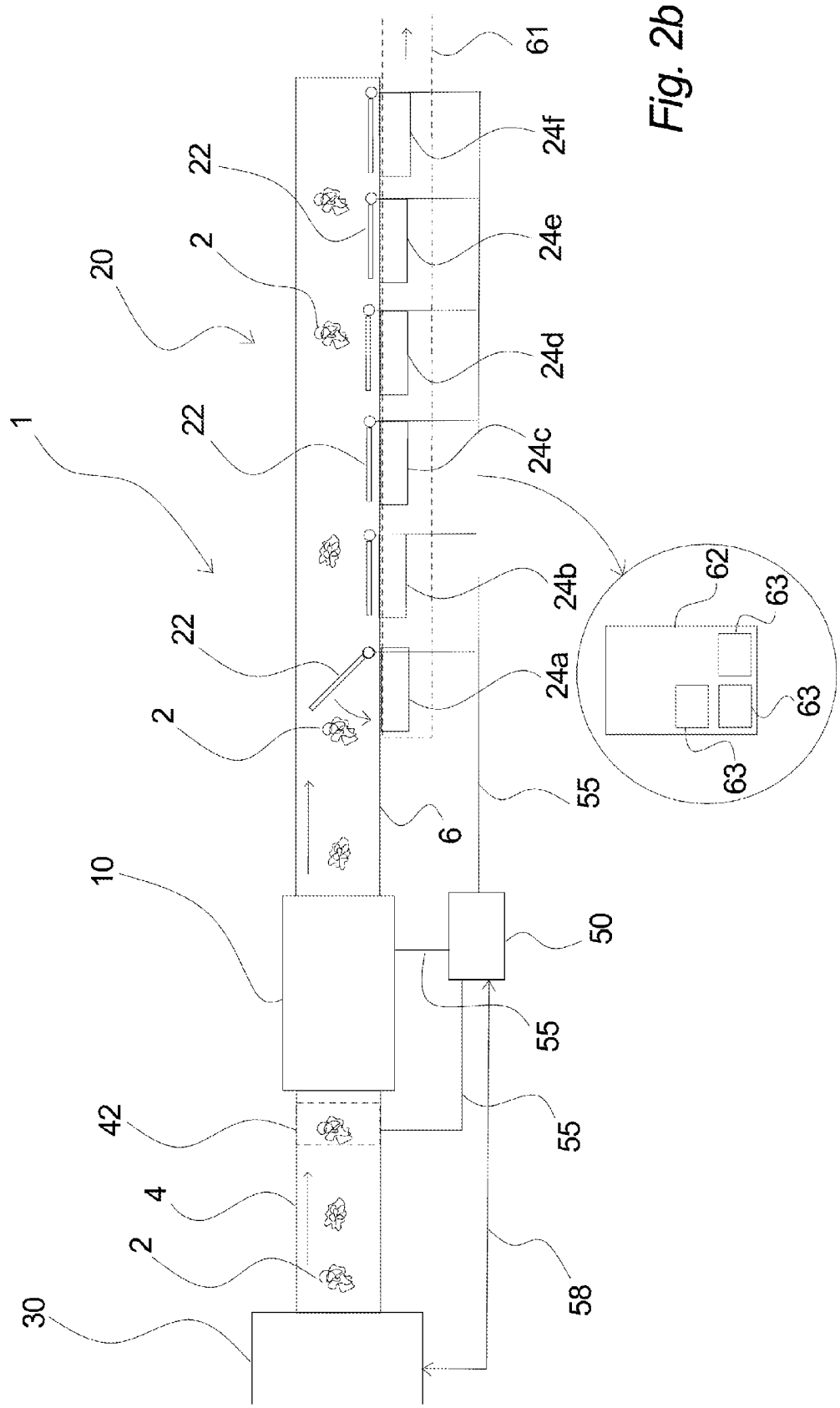

FAT/MEAT GRADING METHOD AND SYSTEM

CROSS-REFERENCES TO RELATED APPLICATIONS

This application is a continuation of patent application Ser. No. 14/336,049 filed on Jul. 21, 2014, which application is a continuation of patent application Ser. No. 13/696,192 filed on Jan. 9, 2013, which application is the national stage application of PCT application number PCT/EP2011/002299 filed on May 9, 2011, which application claims the benefit of priority to Danish patent application number PA 2010 00406 filed on May 7, 2010. The entire disclosures thereof are incorporated herein by reference.

FIELD OF THE INVENTION

The invention relates to a method and a system for processing of meat trim products, which trim products are supplied from a meat processing operation involving cutting up and/or trimming, etc. of meat within the food industry. The method and the system according to the invention may also be referred to as a trim grading method and a trim grading system, respectively.

BACKGROUND OF THE INVENTION

Within the food industry it is well-known that a trimming of meat products is performed in connection with the meat processing.

When a meat product is trimmed the fat is removed from it and the result is
(a) a primary cut and
(b) some fat and trim products.

The "fat" product is essentially fat only whereas "trim" product is any combination of fat and meat. Trim is the result when for example the operator during the process of cutting off the fat is cutting a little too deep and removes some meat together with the fat, e.g. for example when a first cut removes some of the fat, but reveals that more fat needs to be removed, which requires a second cut, which in many cases inevitably results in that some meat is cut off as well.

It is noted that during the meat processing also secondary cuts are produced as well as other small pieces of meat.

For the purpose of this patent application the pieces of fat/meat produced by the trimming process, secondary cuts and any other pieces of meat that are not primary cuts will be referred to as "trim", "trim products", etc. This also means that the term "collection of trim (COT)" used later on also designates a collection of pieces, where the pieces can be what is traditionally referred to as trim or trim products, but where the collection also includes pieces such as secondary cuts, other pieces of meat that is not primary cuts, etc.

The trim is normally classified in categories according to the meat content in percentage. In general it is assessed on line by the operator and the trim is sorted correspondingly. Most often the trim products are sorted in only a limited number of groups, for example 1 to 4 groups. The fat products are handled separately.

The trim products can be used for a plurality of various purposes, e.g. mincemeat, etc., which requires a further processing of the trim products.

When the trim is used in the further processing it is desirable and in most cases necessary to know the fat percentage to a higher degree of accuracy than obtained by the manual assessment. In many cases it is even necessary to adjust the fat percentage to a specified number in order to use the product for various purposes and applications.

WO 2009/102457 A1 discloses methods and systems for sorting meat trim portions by employing quantitative lean point analysis and one or more sorting steps. The document discloses embodiments adapted to make lean point determinations, to compare the determinations to one or more sorting parameters, and to direct meat trim portions to one of a plurality of containers based on the comparison. Meat trim portions from each container are subsequently processed into ground meat. Portions of meat trim, which are obtained from one or more fabrication tables, are identified by one or more of meat trim type, e.g. chick, shank, sirloin, and information associated with lean point (estimated lean point, for example). Portions of meat trim are then preferably presorted into a plurality of containers and the lean point of portions of meat trim originating from a particular presorting container is determined using a lean point analysis system by means of for example X-ray analysis. After performing lean point analysis, the meat trim portions are then sorted into a plurality of combination bins, based on one or both of the determined lean point analysis and a previously identified meat type, identified in connection with the presorting.

WO 03/046533 A2 relates to an apparatus and a process for determining the relative proportions by mass of two or more differing substances contained in a sample comprising a combination of the two or more differing substances, where the sample comprises animal flesh and where the differing substances contained in the sample comprise, respectively, meat and fat. The apparatus and a process utilize an X-ray radiation technique for calculating the relative proportions by mass of the two or more differing substances, which may be meat and fat. According to a particular embodiment the proportions of meat and fat have been determined for each of a plurality of sample pieces of meat and have been fed to a computer. The sample pieces of meat are transported by a conveyor belt to a series of mechanisms for displacing the samples into a series of grading bins, where the aim of the system is to end up with as close to a target fat/lean ratio as possible in each of the bins.

Thus, the prior art according to WO 03/046533 A2 concerns the handling of sample pieces of meat, whereas the present invention is related to the processing of trim products that are produced in connection with meat processing in general as explained above, and in particular to the processing of collections of trims (COTs) that are being produced in connection with the meat processing.

Thus, it is an object of the present invention to present a method and a system for handling trim products resulting from the meat processing.

In particular, it is an object of the present invention to present a method and a system, which provides a higher degree of accuracy as regards the fat percentage categorization of the trim products, i.e. the fat/meat relationship.

Further, it is an object of the invention to present such a method and such a system, which facilitates a higher degree of automated handling of the trim products.

Thus, it is also an object to provide batches of trim products, which facilitate an improved quality of the end products.

These and other objects are achieved by the invention as explained in further detail in the following.

SUMMARY OF THE INVENTION

The invention relates to a method of processing of meat trim products where trim products are supplied as a sequence of collections of trim (COTs), each collection of trim (COT) comprising a plurality of trim products, whereby a fat/meat relationship for a collection of trim (COT) is measured, a collection of trim (COT) is transferred to a selected station by a separator, controlled by a controller, and whereby a batch is completed at a selected station on the basis of data for said fat/meat relationship, said batch comprising one or more collections of trim (COTs) and fulfilling a predetermined criterion regarding a total fat/meat relationship.

Further, the invention relates to a system for processing of meat trim products, wherein trim products are supplied to the system in a sequence of collections of trim (COTs), each collection of trim (COT) comprising a plurality of trim products, said system comprising a trim parameter measuring apparatus (TPMA) designed for measuring the fat/meat relationship for a collection of trim (COT), a separator for transferring a collection of trim (COT) to a selected station, and a controller for controlling the separator to complete a batch at a selected station, based on input from said trim parameter measuring apparatus (TPMA), said batch comprising one or more collections of trim (COTs) and fulfilling a predetermined criterion regarding a total fat/meat relationship.

It is noted that in connection with the present invention it will be understood that the fat/meat relationship for each of a plurality of collections of trim (COTs) is determined or measured as the collections of trim are supplied in sequence. Thereafter, the collections of trim (COTs) are transferred to a selected station, based on the fat/meat relationship for each of the available collections of trim (COTs), based on the data for the collections of trim (COTs) that have already been transferred to each of the available stations (e.g. the total fat/meat relationship for the already accumulated collections of trim (COTs) at each of the stations and possibly also the total weight), and based on the predetermined criterion that has to be fulfilled regarding the total fat/meat relationship. It will be understood that the controller will operate in accordance herewith.

Further, it is noted that a batch is completed and can be e.g. removed, when the collections of trim (COTs), possibly only one, that have been transferred to a station, fulfil(s) the predetermined criterion regarding a total fat/meat relationship (with the relevant tolerances). The predetermined criterion regarding a total fat/meat relationship can e.g. be determined to have been reached by the controller only, since in many instances the controller will operate in order to reach the desired result by accumulating collections of trim (COTs), which only in the specific combination will fulfil the predetermined criterion, but in other instances the controller may operate in such a manner that the accumulated collections of trim (COTs) at any time or at any specific time (e.g. after for example at least two, three, etc. collections of trim (COTs) have been supplied to a station) fulfil the predetermined criterion. In such instances the batch can be said to be completed when it fulfils the predetermined criterion and when it is actually e.g. removed from the station for further handling. It is apparent that in such cases the controller will need to receive confirmation that the batch is now "completed" and that the building up of a new batch is started. An example of such a case will be explained in further detail in the detailed part of the description. Thus, it will be understood that the term "completed" includes both of the above-mentioned understandings.

By this method and/or this system it is achieved that trim products can be provided for further processing with a higher quality as regards the fat percentage than it has otherwise been possible when using the hitherto available manual methods and systems. Further, it is also made possible to achieve a higher degree of consistency as regards the accuracy and/or margins of the fat percentages of the provided batches of trim products. These advantages also ensure that a higher economic outcome can be achieved and that the quality of end products made by means of such batches of trim products is enhanced. Furthermore, the higher degree of automation involved in the process also provides for an enhanced cost-efficiency.

Preferably, weight may be determined for the supplied collections of trim (COTs) by e.g. weighing means and the weight data may be supplied as input to the controller for controlling the separator.

Preferably, the collections of trim (COTs) may be supplied with approximately the same weight.

Hereby, the efficiency of the method and the system can be enhanced, when the individual COTs do not differ significantly from each other, since it is made easier for the controller to find suitable COTs to create a desired batch, e.g. since the number of available COTs with an expected weight and with various fat percentages will be relatively high.

According to further advantageous embodiments, said weighing means may be integrated with the trim parameter measuring apparatus (TPMA) or with the separator or the weighing means may alternatively be independent.

Hereby, a high degree of flexibility is achieved as regards the design and adaptation of the system in general.

In accordance with a further preferable embodiment, the batch that is completed at a selected station, may further fulfill a predetermined criterion regarding the total weight of the batch.

Hereby, the added advantage is achieved that the batches can also be created with a desired accuracy as regards the weight, e.g. that the completed weight lies within a predetermined interval, that the weight fulfils a minimum criterion and/or other weight requirements and/or options, which also add to the overall optimization and efficiency.

According to a particular preferable embodiment, batches that are completed at at least two different stations, may fulfill different criteria as regards the total fat/meat relationship and/or the total weight.

Hereby, it is achieved that it is made easier to use the COT's that are available for the batching, for example when COTs can be used for building up batches having two or more different target fat percentages whereby e.g. the efficiency of the system is increased and the use of the material, e.g. the trim products, is optimized.

According to a further advantageous embodiment, said batch may be completed at said selected station to fulfill said predetermined criterion regarding a total fat/meat relationship, whereby said predetermined criterion regarding a total fat/meat relationship comprises that the meat percentage of collections of trim (COTs) transferred to the selected station exceeds a minimum value at any time during the completion of the batch.

Hereby it is achieved that the output at the station will at any given time from a "zero-time" have a meat content that is above a guaranteed percentage.

Thus, it is also achieved that the operator or operators at the e.g. packing process can simply take material from the station, i.e. the position, whereto the COTs are delivered by the separator, and pack it in boxes or the like of more or less random size and allocate them to a lot of material, comprising one or more pallet(s) or the like, and at the same time ensure that the lot will contain the specified meat percentage.

Thus, it is also achieved that a batch can be provided at any given time, if desired, while still fulfilling the predefined criterion.

It will be understood that a resetting of the "zero-time" is performed, when a specific lot or batch has been completed, e.g. when the total weight of a lot has been obtained, and all material, e.g. all transferred COTs have been removed from the station and allocated to the lot, whereafter the system initiates a subsequent job, e.g. the building up of a new lot with the guaranteed meat percentage.

According to a still further advantageous embodiment, said batch may be completed at said selected station to fulfill said predetermined criterion regarding a total fat/meat relationship, whereby said predetermined criterion regarding a total fat/meat relationship is fulfilled at a specific point in time, determined by the controller.

Preferably, the fat/meat relationship for a collection of trim (COT) may be measured by said trim parameter measuring apparatus (TPMA) by a radiation measurement, preferably using X-ray radiation and detecting means for performing said measurements, in particular in the form of a dual energy system.

Hereby, it is achieved that the measurements can be performed in a reliable and efficient manner. It is mentioned, though, that other measuring and/or detecting means and principles may be used as well.

Advantageously, the sequence and/or the positions of said supplied collections of trim (COTs) may be detected and/or registered, which data may be supplied to the controller.

Hereby, the measured data may be allocated to the individual COTs and the control of the separator to create the desired batches may be implemented in an advantageous manner, Advantageously, additional products, e.g. meat and/or fat products may be added at a station or at a subsequent processing step to complete a batch in order to fulfill said predetermined criterion regarding a total fat/meat relationship.

Hereby, the efficiency of the method and the system may be increased since e.g. a batch may be completed relatively quickly, e.g. because it will not be necessary to wait for a longer period of time for a particular COT having certain characteristics.

In accordance with particular aspects of the invention, said collections of trim (COTs) may be supplied either manually or automatically from a trim source such as a trim table, a flow-line or stream-line table and/or any other trim producing source.

It will thus be understood that a high degree of flexibility as regards the sources of the trim products and COTs are achieved.

In accordance with further aspects of the invention, measured and/or calculated data, e.g. data relating to the fat/meat relationship for one or more collections of trim (COTs) and/or relating to one or more collections of trim (COTs) required for a batch, may be provided as a feedback.

Hereby, a number of advantages may be achieved, including that the controller may use the data for optimizing the processing of the meat products and in particular the building up and completion of the batches of COTs.

According to further embodiments of the invention, said measured and/or calculated data, in particular data relating to the fat/meat relationship for one or more collections of trim (COTs), may be fed to an operator, who has produced said one or more collections of trim (COTs)

Hereby, a number of advantages may be achieved. For example, the fat percentage measurements may be fed back to the individual operators in order to provide guidance and/or training to the operator or operators regarding the trimming process, e.g. as regards whether the operator cuts off more meat than normally and/or necessary, etc. and furthermore the measurements may be used for other purposes, such as general planning, etc.

According to still further embodiments of the invention, said measured and/or calculated data may be fed to the trim source, which supplies collections of trim (COTs).

The information that is fed back may be fed to the e.g. trim table system, the flow-line or stream-line table and/or any other trim producing source, for example to the control unit for such a trim source system in order to provide input to the control unit of the system.

In this connection it is noted that such feedback to the control unit of the system or the operator(s) as also mentioned above may also relate to specific requirements of the system according to the invention, for example in situations where the fat/meat grade system requires a number of COT's having an e.g. higher fat percentage in order to complete one or more batches, and where the source system thus can be controlled to deliver such a number of COTs, if possible.

Other analogous situations may occur, where the control system of the fat/meat grade system can cooperate with a control system of a source system and vice versa. In this manner added advantages can be achieved, since the efficiency of the fat/meat grade system as well as the efficiency of the source system as such can be increased. Thus, the fat/meat grade system according to the invention and a source system can be seen as a cooperating system.

According to a further aspect of the invention, a batch completed at a station may comprise a plurality of sub-batches.

Hereby the advantage is achieved that the sub-batches each can be packed independently so they are easier to handle and e.g. faster to freeze. The batch can e.g. be collected on a pallet of boxes each containing one or more sub-batches.

In this regard it is mentioned that particular advantages can be achieved in connection with the above-mentioned embodiment, according to which a batch may be completed at a selected station to fulfill a total fat/meat relationship, whereby the meat percentage of collections of trim (COTs) exceeds a minimum value at any time during the completion of the batch, and where the operator or operators at the e.g. packing process can simply take material from the station, i.e. the position, whereto the COTs are delivered by the separator, and pack it in boxes or the like of more or less random size.

Preferably, the system may comprise means for conveying said supplied sequence of collections of trim (COTs) to and/or within the system, for example in the form of conveyor belts or the like.

Preferably, the system may comprise means for transporting completed batches to further processing, packaging, boxing, labeling, etc., said means for transporting comprising for example conveyor belts or the like.

THE FIGURES

Figure 1B:
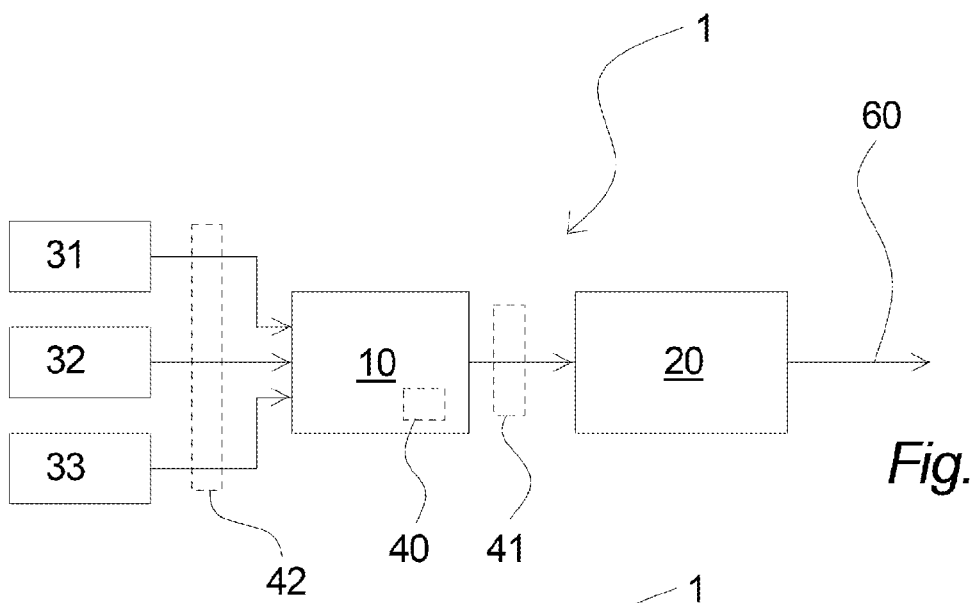
Figure 1C:
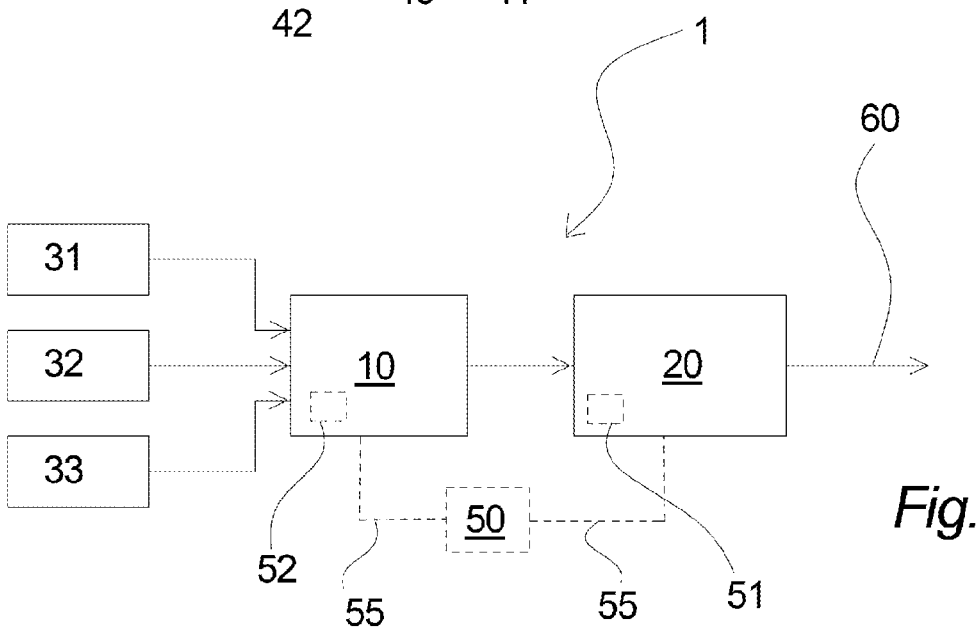
Figure 2A:
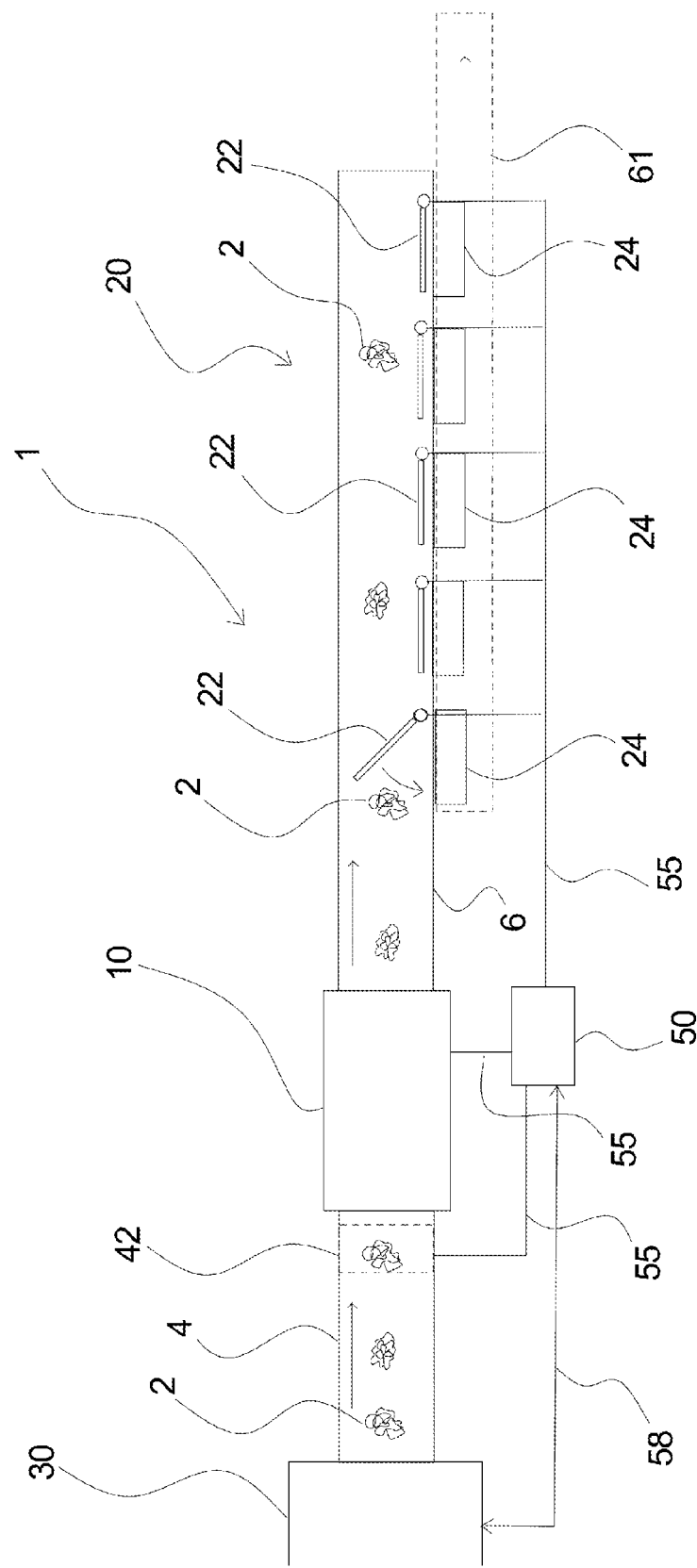

The invention will be explained in further detail below with reference to the figures of which FIGS. 1a-c show different embodiments of a system according to the invention, shown in a schematic manner, and FIGS. 2a-b show embodiments of a system according to the invention in further detail.

DETAILED DESCRIPTION

Different embodiments of a system 1 according to the invention are shown in FIGS. 1a to 1c in a schematic manner, which embodiments will be described in the following. The system, which is generally designated 1, comprises an apparatus 10, which in general is a trim parameter measuring apparatus, also referred to as a TPMA, which is designed for measuring the fat/meat relationship for meat, meat pieces, etc., and in this connection in particular for measuring the fat/meat relationship for a collection of trim (COT), that is supplied to the apparatus 10. The TPMA 10 may be a machine with a conveyor belt supplying the products, e.g. the collections of trim (COTs), which machine or apparatus 10 measures the fat/meat relationship by means of X-rays when the products are going through it. It is preferably a dual energy system, meaning a system using X-ray radiations of two frequencies, where the attenuation of the radiations, e.g. the two frequencies when passing the products are measured and detected, whereafter the characteristics, e.g. the fat/meat relationship of the product can be determined. However, also X-ray radiation systems with a single energy/frequency can be used for this purpose, for example when the height/thickness of the products are even or when the products are formed to have a substantially uniform thickness, cf. for example the technique disclosed in WO 2005/090964.

Furthermore, the system 1 comprises an apparatus 20 for separating the products after they have passed the TPMA 10. Such a separator or separator like unit 20, which will be described in further detail later on, may comprise e.g. a belt conveyor with diverter arms hinged alongside one or both sides. The diverter arms can turn across the conveyor belt in an angle to guide the products, e.g. COT's off the belt into bins, tubs, containers or the like (in general referred to as bins), which are placed e.g. at stations alongside the conveyor. Other means of diverting or moving the products may be used.

The trim products are in sequence fed to the TPMA 10, which trim products are supplied in quantities of approximately the same weight. This can be anything practical, e.g. in the range of 2 to 10 kg. However, other ranges may be used. Further, the quantities may differ from each other to a larger extent. Such a quantity is as also mentioned above referred to as a "collection of trim" (COT).

In FIGS. 1a to 1c it is shown that the COTs can be supplied from different sources 31, 32 and 33. It will be understood that the COTs can be supplied from only one specific source or from two and more sources and that the three sources shown in FIGS. 1a to 1c are for illustrative purposes only.

Such sources from which collections of trim (COTs) are supplied may be any trim table 31, where the operators put the trim into tubs, bins or the like. As mentioned above, the trim products may be assessed on line by the operator and the trim may be sorted correspondingly, where most often the trim products are sorted in only a limited number of groups, for example 1 to 4 groups. From such tubs the products are manually or automatically moved to the trim grading system 1 in COTs of suitable sizes.

The source may be a flow-line or a stream-line table 32, where the COTs are conveyed from the operators in suitable sizes and guided directly to the trim grading system. Examples of flow-line or a stream-line tables are disclosed in for example WO 01/91565, WO 03/077662 and WO 2009/098171.

Further, other sources 33 may be a source of trim products, where the trim products are delivered in a more or less continuous stream or flow. In such cases the flow can be directed to a worker/operator, who performs the task of creating collections of trim COTs of suitable sizes that are led manually, automatically or semi-automatically to the TPMA 10 in the system 1. Further, the operator may assess the trim products and sort the products correspondingly as mentioned above, where most often the trim products are sorted in only a limited number of groups, before the thus created COTs are led to the TPMA 10. In these situations, where the worker/operator performs the task of sorting trim products as a primary function, the operator may be especially trained and/or experienced and may perform the task in a more sophisticated and specialized manner, e.g. by categorizing the products in more categories than normally, etc.

Further, any combination of the above sources 31, 32 and 33 may apply.

Further, the system 1 comprises a controller or control unit for controlling the separator 20 to complete a batch at a selected station, based on input from the trim parameter measuring apparatus (TPMA) 10, where the batch comprises one or more collections of trim (COTs) and fulfils a predetermined criterion regarding a total fat/meat relationship. Thus, the control unit controls for example the diverter arms of the separator 20 such that the planned output is reached.

As shown in FIG. 1c the controller can be an independent controller 50, connected by communication lines 55 to the parts of the system 1, the control unit can be a controller 52 that is part of the TPMA 10 and/or the control unit can be a controller 51 that is part of the separator 20. Furthermore, the controller can be a part of a weighing machine, e.g. a weighing machine that will be explained with reference to FIG. 1b.

As mentioned, the system comprises means for determining the weight of the products, e.g. weighing means, means for estimating, measuring, calculating, etc. the weight based on various measuring principles, as it will be apparent to a skilled person.

As shown in FIG. 1b the weight of the COTs can be determined by the TPMA 10, indicated at 40, or a separate weight determining means or weighing apparatus 41, 42 can be used, for example a conveyor belt based weighing machine that can optionally be put in before (42) or after (41) the TPMA 10.

Furthermore, the system 1 may comprise transport or conveying means 60 for delivering the completed batches for further processing, packaging, freezing, etc.

In general, the system 1 is operated in the following manner:

Trim products, which as mentioned above are supplied in collections of trim (COTs), are in sequence fed to the TPMA 10 and the separator like unit 20. The TPMA 10 measures the fat/meat relationship of the COT's by means of e.g. X-rays when the products are going through it. Either the TPMA 10 or the optional weighing machine 41, 42 determines the weight of the COTs one by one.

The separator 20, controlled by the controller 50, 51 and/or 52, performs a batching of the supplied COTs by guiding the COTs off the belt into bins, tubs, containers or the like (in general referred to as bins), which are placed at stations alongside the separator 20.

The content in a bin is referred to as a batch when it is ready to be removed and fed to the next process.

The control unit 50, 51 and/or 52 controls the separator 20, e.g. the diverter arms of the separator such that the planned output is reached. The control of such a separator 20 can be performed in various manners, which will be apparent to a skilled person within the field of batching, cf. for example GB 2 116 732, EP 781 172, WO 01/07324, WO 01/27567, WO 03/069285 and related prior art documents describing various batching techniques within the food industry.

An example of an embodiment of the system 1 according to the invention, wherein a separator 20 is shown in further detail, is illustrated in FIG. 2a. As described above, the system 1 comprises a trim parameter measuring apparatus TPMA 10, which receives schematically shown collections of trim COTs 2 from a source 30, where the COTs 2 are delivered by a conveyor belt 4. As shown the weight of the individual COT's may be determined by a separate weighing machine 42, but may instead be determined by the TPMA 10 as explained above. After the fat/meat relationship, e.g. the fat percentage has been determined by the TPMA 10, the COT's are transported further on by a conveyor belt 6 forming part of the separator 20. The separator has a number of separator arms 22, diverter wings or the like, by means of which the COTs can be diverted to a selected station, 24 as described above and as further exemplified below, where the COTs are collected in bins, tubs, containers or the like.

In FIG. 2a it is shown that for each station 24 a separator arm 22, diverter wing or the like is placed, but it will be understood that a station 24 may comprise two or more positions, meaning that two or more separator arms 22 may divert COT's to a single station 24, for example in cases where relatively large batches are being made at one or more of the stations 24.

Further, a conveyor belt 61 or the like is illustrated for the purpose of transporting completed batches to further processing, which may include e.g. packaging, boxing, labeling, freezing, shipping, etc.

The controller is shown as a separate control unit 50 in this example, which control unit 50 is connected by lines, wires or channels 55 to the units in the system for receiving measured or determined data and for controlling the separator 20, e.g. the separator or diverter wings 22.

Furthermore, it should be mentioned that the system 1 is designed for e.g. registering the sequence and/or the position of the COT's, which data are combined with the measured and/or determined data regarding the individual COT weight data and the fat/meat relationship, which is necessary in order to perform the batching to achieve batches with the desired target data. Thus, means such as detectors for detecting passing COT's, means for controlling and/or registering, detecting, etc. position and/or speed of conveyor belts etc. may be comprised in the system, which also will be apparent to a person skilled within the art of batching and food industry in general.

Further, as shown in FIG. 2a, a feedback 58 from the controller 50 to the source 30 of the trim products may be present, the significance of which will be explained below.

FIG. 2b shows an embodiment essentially corresponding to the embodiment shown in FIG. 2a, but comprising six stations 24a-24f and illustrating that a batch can comprise sub-batches. Further, the feature of providing batches that can be removed e.g. at any time, e.g. batches that at any time fulfill the predefined criterion, will be explained below with reference to FIG. 2b.

The output of the method and the system according to the invention can for example be in the following form:

A. Relatively Small Batches.

These are in general made of one or a few COTs 2. In general they are created by guiding together COTs 2 of approximately the same fat percentage so that the final batch contain a certain weight (minimum weight or a target weight plus minus a tolerance) with a fat percentage within a pre-determinant range (or below/above a certain number).

It may in this case be necessary to run another job in parallel to this job, simply to utilize all COTs, as only relatively few COTs will be useable for a job as this.

B. Relatively Large Batches.

These are made of several COTs 2. Such batches are in general created by guiding together COT's 2 of different fat percentage in a controlled manner so a pre-determinant final fat percentage (within relatively narrow limits) is obtained. The batch weight can also be controlled to meet a certain final batch weight within controlled tolerances (or below/above a certain number). If the supplied COTs cannot be mixed/batched together to obtain the target fat percentage the process is halted before the final batch weight is obtained and either meat or fat is added to reach the final percentage. Such operation is supported by the system according to the invention.

To utilize the COTs 2 in the best way—i.e. to have a choice for the COTs—it is an advantage to build up several batches in parallel and even better if these are to be terminated with different fat percentages.

C. Relatively Large Batches Packed in Sub-Batches.

This is in general as B, but the batch is divided into several sub-batches. This has the advantage compared to B that the sub-batches each can be packed independently so they are easier to handle and e.g. faster to freeze.

The batch can e.g. be collected on a pallet of boxes each containing one or more sub-batches. Such an example is shown in FIG. 2b, where at the station 24c it is illustrated that the COTs are packed in boxes 63, which are placed or collected on a pallet 62.

D. Average Meat/Fat Relationship Maintained.

A further embodiment which may be of particular importance when dealing with relatively large batches, cf. e.g. embodiment C as described above, involves the feature that at one or more, possibly all separator positions or stations 24, the output is so arranged that the meat content of the COTs at any given time from a "zero-time" is above a guaranteed percentage.

If for example a system is considered where a total of six separator positions or stations, e.g. 24a, 24b, 24c, 24d, 24e and 24f as shown in FIG. 2b are operated according to this feature, the stations 24a, 24b and 24c may for example be set to a meat percentage of minimum 94% and the stations 24d, 24e and 24f may for example be set to a meat percentage of minimum 85%.

When a collection of trim COT arrives to the measuring equipment, e.g. TPMA 10, the controller or control unit guides it to one of the six positions, such that the meat content at that position is kept just above the chosen percentage.

In this way the operators at the e.g. packing process can just take material from a separator position or station, e.g. 24a-24f, and pack it into boxes of more or less random size and allocated them to a lot of material, where a lot can be one or several pallet(s), and at the same time obtain that such a lot will contain the meat percentage specified. This is shown for the station 24c, where the material, i.e. COTs are packed into boxes 62, which are placed on a pallet 62. As mentioned above, a lot can comprise one or more pallets 62.

When a lot is almost finished, the operator(s) there must
(1) stop the guidance of material to that particular separator position or station,
(2) pack the remaining material (COTs) at the separator position or station in question into boxes and allocate them to the lot in question and
(3) reset the separator position or station so it starts from scratch again, e.g. perform an operation that indicates to the controller or control unit that the "zero-time" for the separator position or station in question is reset.

Further, it is noted that the lot (or batch) can be finished at any given time from the "zero-time" since the predefined criterion, i.e. that the meat percentage is above a guaranteed percentage, is fulfilled.

E. A Feedback Signal to the Operator.

For information and/or guidance purposes feedback information can be arranged concerning the fat percentage of each COT 2 to the operators of a specific source 30, 31, 32, 33. Such information can be arranged in various ways to suit the purpose (average percentage over shorter or longer periods, tendencies etc). Such a feedback may for example facilitate the above-mentioned embodiment D, where an average meat/fat relationship is maintained at each station, and where the requirements for material of a certain meat/fat relationship can be fed back to e.g. the operators trimming the meat in order for the system to meet the requirements in question.

Further, feedback to e.g. the operators processing and/or trimming the meat may in addition to or instead of instruction purposes serve for training purposes.

Furthermore, it is mentioned that the feedback may also or instead be fed to the source system itself, e.g. a control unit of the source system, where it may be used e.g. as a control input for e.g. optimizing the efficiency of the source system. Further, such a feedback signal may also serve as a control input to the source system in order to make the source system deliver e.g. COTs of a particular characteristic to the fat/meat grader system 1, as also exemplified above, which will improve the efficiency of the fat/meat grade system 1. Other such examples of a cooperation taking place between the two systems are possible, whereby a particular advantageous symbiotic effect will be achieved. For example, in cases where the source system performs a processing of meat that in addition to primary cuts, fat products, trim in its normally used sense also results in secondary cuts, the source system can be controlled by the fat/meat grader system 1 to deliver such secondary cuts in COTs in for example a situation, where the fat/meat grader system 1 needs COTs having a low fat percentage in order to complete a batch to a specified target fat percentage or to maintain an average meat/fat relationship. Other similar scenarios are possible.

Further, it is noted that the feedback may be used for establishing traceability between the batches that are being made by the system 1 and the meat products that are being processed by the source system. The meat products processed by the source system have e.g. identifications for establishing traceability in particular for the primary cuts, but when feedback can be established from the fat/meat grader system 1 to the source system, traceability can also be provided for the trim products that are being used for the completed batches. Thus, it may in this way be possible to identify for example which animals have been used for producing e.g. a batch of trim products.

A similar effect as regards traceability can be achieved by providing/transmitting information from the source system to the fat/meat grader system 1.

Any combination of the above can be arranged.

Furthermore, it is noted that in the industrial application it will be an advantage to e.g. utilize the knowledge of the operator's performance during the batching process. Hence the control unit 50 (among other things of more or less the same nature) may take into account that a certain operator produces trim with a higher percentage of fat than another one and keeps track of how often this operator supplies a COT 2.

Further, it is noted that the method and the system according to the invention has been described above with reference to particular embodiments, but it will be understood that the invention is not limited to the particular examples described above and shown in the drawings, but may be modified in numerous manners within the scope of the invention.

What is claimed is:

1. Method of processing of meat trim products, comprising the steps of:
   supplying trim products as a sequence of collections of trim (COTs), each collection of trim (COT) comprising a plurality of trim products;
   measuring a fat/meat relationship for at least one of the collections of trim (COT);
   transferring at least one of the collections of trim (COT) to a selected station by a separator, controlled by a controller; and
   completing a batch at a selected station on the basis of data for said fat/meat relationship and based on the data for the collections of trim (COTs) that have already been transferred to each of the available stations, said batch comprising one or more collections of trim (COTs) and fulfilling a predetermined criterion regarding a total fat/meat relationship.

2. Method according to claim 1, wherein weight is determined for the supplied collections of trim (COTs) and wherein the weight data is supplied to the controller.

3. Method according to claim 1, wherein collections of trim (COTs) are supplied with approximately the same weight.

4. Method according to claim 1, wherein said batch that is completed at a selected station further fulfils a predetermined criterion regarding the total weight of the batch.

5. Method according to claim 1, wherein batches that are completed at at least two different stations fulfill different criteria as regards to the total fat/meat relationship and/or the total weight.

6. Method according to claim 1, wherein said batch is completed at said selected station to fulfill said predetermined criterion regarding a total fat/meat relationship, whereby said predetermined criterion regarding a total fat/meat relationship comprises that the meat percentage of collections of trim (COTs) transferred to the selected station exceeds a minimum value at any time during the completion of the batch.

7. Method according to claim 1, wherein said predetermined criterion regarding a total fat/meat relationship is fulfilled at a specific point in time, determined by the controller.

8. Method according to claim 1, wherein the fat/meat relationship for a collection of trim (COT) is measured by a radiation measurement using X-ray radiation and detecting equipment for performing said measurements.

9. Method according to claim 1, wherein the sequence and/or the positions of said supplied collections of trim (COTs) are detected and/or registered, which data is supplied to the controller.

10. Method according to claim 1, wherein additional meat and/or fat products are added at a station or at a subsequent processing step to complete a batch in order to fulfill said predetermined criterion regarding a total fat/meat relationship.

11. Method according to claim 1, wherein said collections of trim (COTs) are supplied either manually or automatically from a trim source such as a trim table, a flow-line or stream-line table and/or any other trim producing source.

12. Method according claim 11, wherein measured and/or calculated data relating to the fat/meat relationship for one or more collections of trim (COTs) and/or relating to one or more collections of trim (COTs) required for a batch is provided as a feedback.

13. Method according claim 12, wherein said measured and/or calculated data, in particular data relating to the fat/meat relationship for one or more collections of trim (COTs), is fed to an operator who has produced said one or more collections of trim (COTs).

14. Method according claim 12, wherein said measured and/or calculated data is fed to the trim source which supplies collections of trim (COTs).

15. Method according to claim 1, wherein a batch completed at a station comprises a plurality of sub-batches.

16. System for processing of meat trim products, wherein trim products are supplied to the system in a sequence of collections of trim (COTs), each collection of trim (COT) comprising a plurality of trim products, said system comprising:
 a trim parameter measuring apparatus (TPMA) designed for measuring the fat/meat relationship for at least one of the collections of trim (COT);
 a separator for transferring the at least one of the collections of trim (COT) to a selected station; and
 a controller for controlling the separator to complete a batch at a selected station based on input from said trim parameter measuring apparatus (TPMA) and based on fat/meat relationship data for the collections of trim (COTs) that have already been transferred to each of the available stations, said batch comprising one or more collections of trim (COTs) and fulfilling a predetermined criterion regarding a total fat/meat relationship.

17. System according to claim 16, wherein the system further comprises weighing equipment for determining the weight of each collection of trim (COT), and wherein said controller for controlling the separator receives input from said weighing equipment.

18. System according to claim 17, wherein said weighing equipment is integrated with the trim parameter measuring apparatus (TPMA) or with the separator or wherein the weighing equipment is independent.

19. System according to claim 16, wherein said controller is adapted for controlling the separator to complete a batch at a selected station, which batch further fulfils a predetermined criterion regarding the total weight of the batch.

20. System according to claim 16, wherein said controller is adapted for controlling the separator to complete batches at at least two different stations, wherein said batches fulfill different criteria in regards to the total fat/meat relationship and/or the total weight.

21. System according to claim 16, wherein said system is configured for completing said batch at said selected station to fulfill said predetermined criterion regarding a total fat/meat relationship, whereby said predetermined criterion regarding a total fat/meat relationship comprises that the meat percentage of collections of trim (COTs) transferred to the selected station exceeds a minimum value at any time during the completion of the batch.

22. System according to claim 16, wherein said predetermined criterion regarding a total fat/meat relationship is fulfilled at a specific point in time determined by the controller.

23. System according to claim 16, wherein said trim parameter measuring apparatus (TPMA) comprises X-ray radiation and detecting equipment for measuring the fat/meat relationship for a collection of trim (COT).

24. System according to claim 16, wherein the system comprises equipment for detecting and/or registering the sequence and/or the positions of said supplied collections of trim (COTs).

25. System according to claim 16, wherein the system is designed for adding additional products at a station or at a subsequent processing step to complete a batch in order to fulfill said predetermined criterion regarding a total fat/meat relationship.

26. System according to claim 16, wherein said collections of trim (COTs) are supplied either manually or automatically from a trim source such as a trim table, a flow-line or stream-line table and/or any other trim producing source.

27. System according to claim 16, wherein said system is designed for feeding measured and/or calculated data; in particular, data relating to the fat/meat relationship for one or more collections of trim (COTs) and/or relating to one or more collections of trim (COTs) required for a batch as a feedback signal.

28. System according to claim 27, wherein said system is designed for feeding said measured and/or calculated data; in particular, data relating to the fat/meat relationship for one or more collections of trim (COTs), to an operator who has produced said one or more collections of trim (COTs).

29. System according to claim 27, wherein said system is designed for feeding said measured and/or calculated data to the trim source which supplies trim products.

30. System according to claim 16, wherein said system is designed in order to produce a batch that is completed at a station as a plurality of sub-batches.

31. System according to claim 16, wherein said system comprises equipment for conveying said supplied sequence of collections of trim (COTs) to and/or within the system in the form of conveyor belts.

32. System according to claim 16, wherein said system comprises equipment for transporting completed batches to further processing, packaging, boxing or labeling, said equipment for transporting comprising for example conveyor belts.

* * * * *